May 1, 1928.  1,667,776
J. S. ELOFSON
MILK PAIL
Filed Dec. 11, 1926
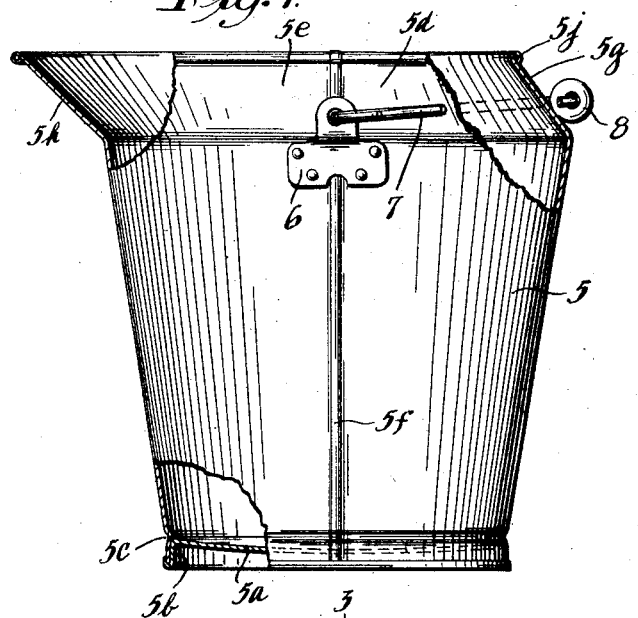
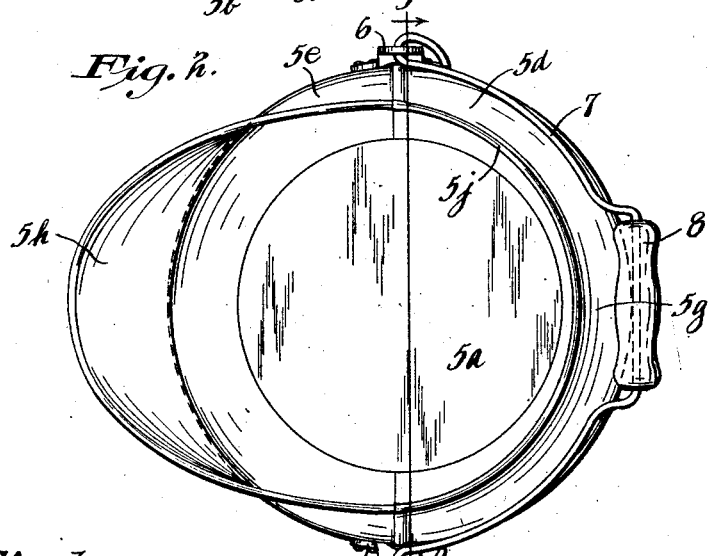
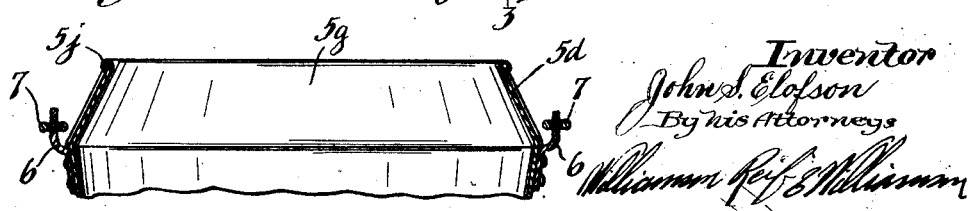
Inventor
John S. Elofson
By his Attorneys Patented May 1, 1928.

1,667,776

UNITED STATES PATENT OFFICE.

JOHN S. ELOFSON, OF HASTY, MINNESOTA.

MILK PAIL.

Application filed December 11, 1926. Serial No. 154,275.

This invention relates to a bucket or pail and particularly to a milking pail. As is well known, when cows are milked by hand, the milk is received in a bucket which is held by the operator. It is a common practice for the operator to sit on a low stool during the milking operation and to hold the bucket between the knees. The person milking is not always in the same position relatively to the cow's udders, and is not always the same distance from the udders. The pail or bucket used must therefore be turned and inclined in order properly to receive the milk. With an ordinary pail this results in a considerable portion of the milk not being directed into the bucket or pail and the milk is very frequently directed against the side of the pail from which it is deflected and splashed onto the shoes and trousers of the operator. The milk often also does not strike the pail and is hence directed onto the shoes or trousers of the operator.

It is an object of this invention, therefore, to provide a pail into which the milk can efficiently be directed, so that the splashing of the shoes and clothing of the operator is avoided.

It is a further object of the invention to provide an anti-splash pail having a portion adapted to be turned in the direction of the cow's udders and to effectively receive the milk.

It is also an object of the invention to provide such a pail as set forth in the preceding paragraph, which also has an upper portion extending about the sides and rear thereof and inclined inwardly toward the center of the bucket to prevent the milk which jumps up as the milking stream strikes the milk in the pail, from getting out of the pail.

It is more specifically an object of the invention to provide a milking pail of frusto-conical form tapering toward its bottom and having an upper portion of comparatively short height extending about the sides and rear of the pail and inclined inwardly toward the center thereof, said portion projecting at the front of the pail in a scoop-like spout.

These and other objects and advantages of the invention will be fully set forth in the following description made in connection with the accompanying drawings, in which like reference characters refer to similar parts throughout the several views and in which:—

Fig. 1 is a view in side elevation of the pail, certain portions being broken away and other portions being shown in vertical section;

Fig. 2 is a top plan view of the pail; and

Fig. 3 is a partial vertical section taken on line 3—3 of Fig. 2.

Referring to the drawings, a pail is shown having the main body portion 5 of frusto-conical form with its smaller portion at the bottom. While this pail may be formed in any suitable and desired manner, in the embodiment of the invention illustrated it is shown as having a bottom 5ª of circular shape inclining downwardly, toward its center, and having a vertical downwardly and outwardly extending flange 5ᵇ of cylindrical shape, the edge of which is crimped over the bottom edge of the body portion 5, said body portion having a crimp or inwardly directed bead 5ᶜ disposed at the top of flange 5ᵇ. The pail is also shown as made in two overlapped sections 5ᵈ and 5ᵉ, divided substantially through a central plane extending transversely of said pail, which sections are shown as connected by the crimp or bead 5ᶠ, and the same will be connected by some suitable adhesive such as solder. The pail 5 has an upper portion or flange 5ᵍ illustrated as continuous with the frusto-conical portion 5, which portion 5ᵍ extends about the sides and rear of the pail and as shown in Figs. 1 and 3, inclines inwardly, toward the center of said pail forming a partial cover or deck at the rear thereof. The portion 5ᵍ extends from each side toward the front of the pail and projects at the front side of the pail in the form of a scoop-shaped spout 5ʰ. The central line of this spout has the inclination shown in Fig. 1 and it will be seen that the top edge of the spout is of curved contour. The pail is shown as having its top edge rolled into the bead 5ʲ. The pail also carries the ears 6 at each side thereof, which are shown as riveted to the pail and as having apertures receiving the eyelets at the ends of the bail handle 7 equipped with the revoluble grip portion 8 at the center thereof, disposed in a U-shaped bend in said handle.

In operation the operator will dispose the pail in front of him and may have the same disposed between his legs or knees, and will have the spout 5ʰ directed toward the cow's udders. When the milk is directed toward the pail, this spout projects beyond the pail so that there is practically no chance that any of the milk will miss the pail. If any of the milk should strike the top of the spout 5ʰ, it will be deflected into the pail and there is no danger of the milk splashing out. As the milk is directed into the top of the pail, the flange or portion 5ᵍ will also effectively prevent any splashing, and prevent anything dropped at the rear of the pail from entering the same.

From the above description it is seen that applicant has provided a very simple and effective anti-splashing milk pail. The pail can readily be placed into position to receive all of the milk and the objectionable splashing of the shoes and clothing of the operator is prevented.

The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A milk pail having a body portion of frusto-conical shape and an upper portion continuous with the top of said body portion projecting at the front of said body portion at an angle thereto in a scoop-like spout, and extending around said pail from the sides of said spout and inclined inwardly to the vertical axis of said pail, the top edge of said upper portion being disposed in a substantially horizontal plane.

2. A milk pail having a body portion and an upper portion of relatively small height extending about the rear and sides of said pail and inclined inwardly at the rear and side thereof, said portion projecting beyond the sides of the pail and projecting at an angle to the front side of the pail in the form of a spout having a curved edge.

3. A milk pail having a body portion of circular shape in horizontal cross section and an upper portion comprising a flange extending across the rear of the bucket inwardly toward the center at an angle to the longitudinal axis of the bucket, forming a cover at said rear and projecting from the sides of said body at the front thereof to form a spout.

4. A milk pail having a body portion of frusto-conical shape, slightly tapered toward its bottom, and an upper portion comprising a flange extending about said body portion, said flange being inclined inwardly at the rear and sides of said pail, but inclined outwardly at the front of said pail to form a comparatively flat spout, said spout forming a substantial angle with the front of said pail.

5. A milk pail having a body portion substantially circular at its upper end and having a flange above said end extending upwardly therefrom forming an open top, said flange inclining inwardly at the rear and sides of said pail but extending outwardly over the side and at the front of said pail to form an extended spout adapted to receive the streams of the milk in the milking operation.

In testimony whereof I affix my signature.

JOHN S. ELOFSON.